United States Patent Office 3,319,421
Patented May 16, 1967

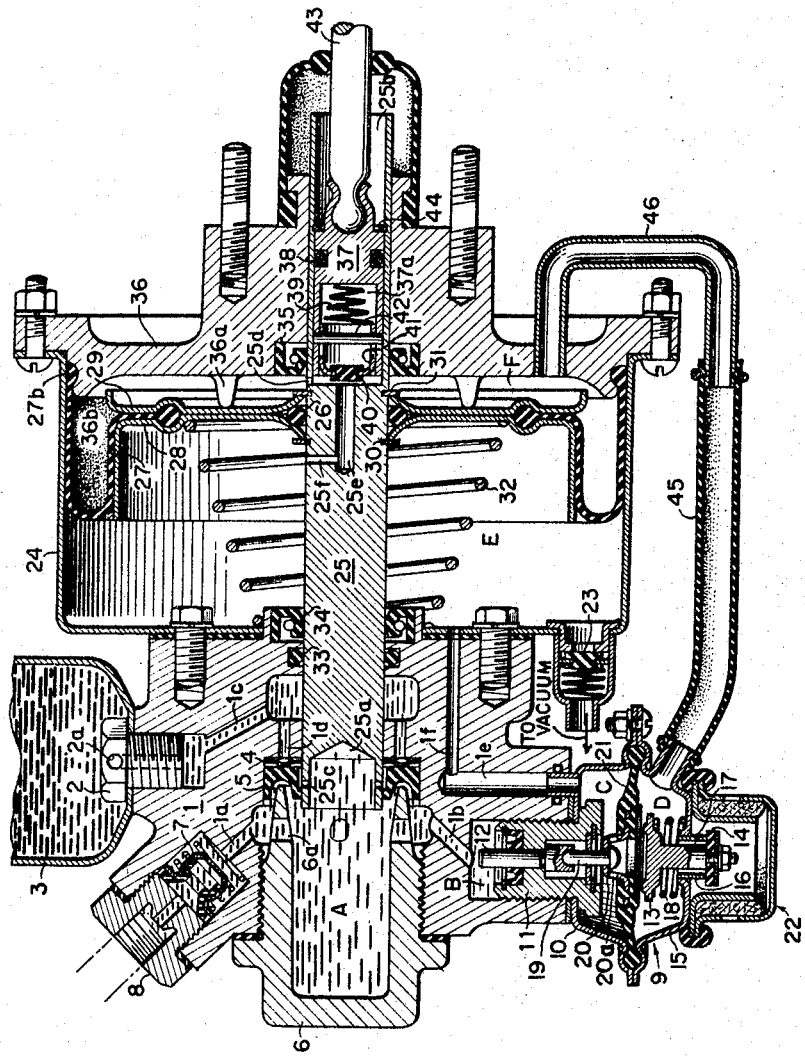

3,319,421
VEHICLE BRAKE APPARATUS EQUIPPED WITH A BOOSTER
Tsuneo Kawabe, Kariya, Japan, assignor to Aishin Seiki Kabushiki Kaisha, Kariya, Japan
Filed July 26, 1965, Ser. No. 474,917
Claims priority, application Japan, Aug. 3, 1964, 39/44,279
2 Claims. (Cl. 60—54.6)

This invention relates to an improvement in a vehile brake apparatus equipped with a booster as mentioned in copending patent application Ser. No. 448,164, filed Apr. 14, 1965, by Shigeo Aiki et al., now Patent No. 3,257,811, in which the booster device is arranged concentrically with respect to the master cylinder and is provided with a specially designed control valve unit adapted to be actuated by increased oil pressure in the master cylinder for controlling the booster to increase the oil pressure to be conveyed to the wheel cylinders. The object of this invention is to improve the aforementioned invention of the copending application by providing a reliable device for facilitating and attaining quick return motion of the various parts upon release of the pressure on the brake pedal in such vehicle brake apparatus.

The accompanying drawing shows a longitudinal sectional view of the apparatus according to this invention, illustrating a specific embodiment thereof, in order that its utility and functioning will be thoroughly appreciated. It will be understood, however, that this is by way of illustration only and is not to be taken as limiting the invention in any way.

Referring to the drawing, 1 designates a master cylinder of a vehicle brake apparatus provided with an oil reservoir 3 connected thereto through a thread fitted plug and a nut 2 having an oil orifice 2a. In the inner portion of the cylinder body 1, there is provided a piston cup 5 and a spacer 4. A cap 6 having oil orifices 6a forms an oil chamber A which is in communication with wheel cylinders (not shown) through said orifices 6a, an oil duct 1a and a plug 8 provided with a residual pressure valve 7. B is an oil chamber communicating with the oil chamber A through a channel 1b. Connected to the casing enclosing the chamber B, there is a controlling valve unit generally shown as 9.

The casing of the controlling valve unit 9 consists of two shells, the upper shell 10 and the lower shell 15. A valve cylinder or plug 11 is thread fitted in the oil chamber B, and a control piston 12 is inserted through the central bore of the plug 11, and the upper end of the piston protrudes into the oil chamber B. The lower end of said piston 12 has an enlarged head forming a step which is located in a cavity formed in the plug 11, and said cavity forms a shoulder against which the step on the piston 12 abuts. On the lower shell 15 there is mounted a cylindrical valve seat 16 encircling a valve stem 17 having an upper enlarged head 13 and a lower valve disc 14. A spring 18 serves to normally hold the valve disc 14 seated upon the lower end of the valve seat 16. A control diaphragm 21 having a holder 20 partially embedded therein is clamped at its periphery between the upper and lower shells 10 and 15. The lower end of the actuating pin 19 is carried by said holder 20, and its upper end is inserted into the lower end of the lower enlarged end of the control piston 12 as shown. As the control diaphragm 21 is normally held apart from the valve head 13 of the air valve 17, the air chambers C and D partitioned by the diaphragm 21 are in communication under negative pressure through orifices 20a in the holder 20. 22 is an air cleaner provided in the air suction end of the valve unit 9.

24 is a booster drum or cylinder secured to one end of the master cylinder body 1, which is provided with a non-return valve 23 connected to a negative pressure producing apparatus such as the inlet manifold of the engine or a negative pressure reservoir (not shown). The main piston 25 has a cavity 25a at one end and a deep cavity 25b at the other end portion. The wall of the cavity 25a is provided with an orifice 25c which is normally in communication with the oil reservoir 3 through the channel 1c and with the oil chamber A through the channel 1a. The wall of the deep cavity 25b is provided with an orifice 25d. The piston 25 is provided with an axial bore 25e opening out of the bottom portion of the cavity 25b and communicates with the interior of the booster drum 24 through a radial channel 25f. At the position between the orifice 25d and the radial channel 25f, there is mounted on the piston 25 the inner portion of the clamp discs 28 and 29 for a booster diaphragm 27, there being a packing ring 26 between the retainer rings 30 and 31 fixed to the piston.

In the booster drum 24, a spring 32 is provided abutting against the clamp disc 28. 33 and 34 are packing rings surrounding the piston 25. The end plate 36 having inwardly protruding stops 36a is provided with a packing ring 35. Said stops 36a normally abut against the clamp disc 29 of the booster diaphragm 27 and are adapted to prevent the closure of the oil orifice 25d by limiting the rearward movement of the diaphragm and the piston 25. The outer peripheral bead edge 27b of the diaphragm 27 is clamped by the peripheral flange 36b of the end plate 36. Thus, the booster drum 24 is divided by the diaphragm 27 into two air chambers E and F.

37 is an auxiliary piston slidably inserted into the deep cavity 25b in the main piston 25 and having a packing ring 38 and, at the front end, there is a cavity 37a. In said cavity, there is slidably mounted a cap-like valve stem 41 carrying a valve disc 40. The valve stem 41 has oblong slots and is mounted on a cross pin 42 passing through said slots, so that the sliding movement of the valve is limited by said oblong slots. The valve disc 40 faces toward the mouth of the axial bore 25e formed in the piston 25, and is normally urged forwardly by means of a spring 39. The valve disc 40 is normally held in a position slightly protruding from the forward edge of the auxiliary piston 37, but does not close the mouth of the axial bore 25e as shown. The other end of the auxiliary piston 37 is connected to a push rod 43 associated with a conventional brake pedal.

On the inner wall of the deep cavity 25b of the main piston, there is fixed a stop ring 44 projecting inwardly, which limits the return movement of the auxiliary piston 37 caused by the return spring of the brake pedal mechanism, so that the auxiliary piston 37 is normally held in such position that the valve disc 40 is slightly spaced from the mouth of the axial bore 25e. Thus, in the normal position, the air chambers E and F are kept in communication under negative pressure through the orifice 25d, the bore 25e and the radial channel 25f in the main piston 25. On the other hand, the air chamber E of the booster drum is in communication with the air chamber C of the control valve unit 9 through the ducts 1e and 1f formed in the master cylinder body 1, while the air chamber F of the booster drum is in communication with the air chamber D of the control valve unit 9 through the pipes 45 and 46.

In the above mentioned arrangement, it is to be understood that the air chambers E and F of the booster drum are normally in communication through a direct passage comprising the orifice 25d, the axial bore 25e and the radial channel 25f, while said air chambers E and F are in communication through an indirect passage comprising the pipes 46, 45, the air chamber D, the orifices 20a, the air chamber C of the control valve unit 9, and channels 1e and 1f.

The operation of the present invention is as follows: When the brake pedal is actuated through the push rod 43 the auxiliary piston 37 will be moved forwardly and the valve disc 40 biassed by the spring 39 closes the mouth of the axial bore 25e, so that the booster drum 24 will be shut off. Immediately thereafter, the forward end of the auxiliary piston 37 will reach the bottom of the deep cavity 25b, while the valve disc 40 is closing the mouth of the bore 25e as it is pressed against it by the action of the spring 39. Thus, the pressure of the push rod 43 is transmitted to the main piston 25.

By the forward movement of the main piston 25, the oil orifice 25c is closed by the piston cup 5, so that the passage of the oil from the reservoir 3 to the oil chamber A through the channels 1c, 1d and the orifices 25a and 25c will be shut off. Thereafter, upon continued movement of the main piston 25 the oil pressure in the oil chamber A will be increased, and the increased oil pressure will be transmitted to the wheel cylinders through the orifice 6a, the duct 1a, the valve 7 and the plug 8, thereby starting the braking action. Simultaneously, oil pressure is introduced into the oil chamber B of the control valve unit 9 through the oil orifices 6a and the channel 1b, and the oil pressure will act on the control piston 12, whereby the diaphragm 21 will be moved downwardly to abut against the upper head of the air valve 17, so that the communication between the air chambers C and D through the orifice 20a in the diaphragm support 20 is shut off. Thus, the indirect passage providing communication between the air chambers E and F of the booster drum 24 will be shut off.

Upon continued pressure upon the brake pedal, and consequent increase of the oil pressure in the oil chamber A, the movement of the control piston 12 and the control diaphragm 21 will be further increased, so that the air valve 17 will be further moved against the action of the spring 18 and the lower head of the valve 17 will be released from the valve seat 16, thereby allowing the suction of air into the air chamber D and, through the pipes 45, 46 into the air chamber F, whereby the pressure difference produced thereby will act upon the booster diaphragm 27. Consequently, the main piston 25 will be further moved forwardly against the action of the return spring, so that the wheel cylinder pressure will rapidly be increased to effect the augmented braking action.

When the pressure on the brake pedal is released, it will rapidly return to the initial position, and the auxiliary piston 37 connected to the push rod 43 will also rapidly return to the intial position to which it is limited by the stop ring 44, so that the forward end of the auxiliary piston 37 will be moved away from the bottom of the deep cavity 25b of the main piston 25 and also the valve disc 40 will open the mouth of the central bore 25e. Consequently, the direct passage of air through the orifice 25d, the bore 25e and the dial channel 25f will be established, whereby the air chambers E and F of the booster drum will be put into communication, and the pressure difference between them will disappear. Thus, it will be seen that there will remain no resistance to the return motion of the main piston 25 due to the pressure difference, so that the main piston 25 can be returned quickly by the action of the spring 32, regardless of the postion of the air valve 17, the valve seat 16 and the control diaphragm 21 in the control valve unit 9.

According to the quick return motion of the main piston 25 in the above mentioned manner, oil pressure in the oil chambers A and B will be rapidly decreased. Consequently, in the control valve unit 9 the air valve 17 will contact with the valve seat 16 by the action of the spring 18, thereby shutting off the suction of air into the air chamber D, and the control diaphragm 21 will be retracted from the upper head 13 of the air valve 17, so that the passage of air from the air chamber C to the air chamber E and from the chamber D to the air chamber F will be put into communication, producing the communication between the chambers E and F of the booster drum, whereby the brake system returns to its initial normal position.

It will be seen from the foregoing that, according to the characteristic feature of the present invention, when the pressure on the brake pedal is released the main piston 25 of the master cylinder is most quickly returned to its inital position by quickly minimizing the back pressure on the main piston applied by the pressure difference between the air chambers E and F of the booster drum 24. This is most desirable especially where the brake is applied frequently at short intervals.

What I claim is:

1. A vehicle brake apparatus comprising a master cylinder, a piston in said master cylinder, a booster drum arranged concentrically with respect to said master cylinder and divided into two air chambers by a spring pressed diaphragm connected to said piston of the master cylinder, a control air valve unit adapted to be actuated by the oil pressure in the master cylinder and having two air chambers, one of the air chambers of said booster drum being connected to a source of negative pressure and to one of the air chambers of said control valve unit and the other air chamber of the booster drum being connected to the other air chamber of said control valve unit, means influenced by an increase of oil pressure in the master cylinder for shutting off the communication between the two air chambers of said control air valve unit and for bringing the second air chamber of the control air valve unit in communication with the atmosphere so as to produce a pressure difference between the two air chambers of said booster drum, thereby actuating the piston of the master cylinder to further increase the oil pressure in the master cylinder, said piston having a direct passage connecting the two air chambers of the booster drum, and a second piston adapted to be actuated by a brake pedal and carrying a valve shutting off said direct passage when the brake pedal is actuated, and opening said direct passage when the brake pedal is released, thereby causing a quick return motion of the spring pressed diaphragm in the booster drum.

2. A vehicle brake apparatus comprising a master cylinder, a piston in said master cylinder, a booster drum arranged concentrically with respect to said master cylinder and divided into two air chambers by a spring pressed diaphragm connected to said piston of the master cylinder, a control air valve unit adapted to be actuated by the oil pressure in the master cylinder and having two air chambers, one of the air chambers of said booster drum being connected to a source of negative pressure and to one of the air chambers of said control valve unit and the other air chamber of the booster drum being connected to the other air chamber of said control valve unit, means influenced by an increase of oil pressure in the master cylinder for shutting off the communication between the two air chambers of said control air valve unit and for bringing the second air chamber of the control air valve unit into communication with the atmosphere so as to produce a pressure difference between the two air chambers of said booster drum, thereby actuating the piston of the master cylinder to further increase the oil pressure in the master cylinder, the main piston of the master cylinder having a deep cavity at the rear end thereof, an auxiliary piston slidably mounted in said deep cavity and having at its front end a valve, and said main piston is provided with a direct passage between the two air chambers of said booster drum and comprising an orifice opening into one of the two air chambers, an axial bore into which said orifice opens, and a radial channel extending from said axial bore to the other of the two air chambers of the booster drum, said valve shutting off said direct passage when the brake pedal is actuated and opening said direct passage when the brake pedal is released.

References Cited by the Examiner

UNITED STATES PATENTS

| | | | |
|---|---|---|---|
| 1,472,801 | 11/1923 | Loughead | 60—54.6 X |
| 2,670,603 | 3/1954 | Allin et al. | 60—54.5 |

MARTIN P. SCHWADRON, *Primary Examiner.*

ROBERT R. BUNEVICH, *Examiner.*